United States Patent [19]
Crowley, Jr. et al.

[11] Patent Number: 4,561,041
[45] Date of Patent: Dec. 24, 1985

[54] ESCAPSULATED CHIP CAPACITOR ASSEMBLIES

[75] Inventors: Harris L. Crowley, Jr., Simpsonville; Everett T. Coyle, Jr., Greenville, both of S.C.

[73] Assignee: Union Carbide Corporation, Danbury, Conn.

[21] Appl. No.: 643,184

[22] Filed: Aug. 22, 1984

[51] Int. Cl.⁴ ............................................... H01G 9/05
[52] U.S. Cl. .................................................. 361/433
[58] Field of Search .......................... 361/433; 29/570

[56] References Cited

U.S. PATENT DOCUMENTS

| 3,516,150 | 6/1970 | Leech | 361/433 X |
| 3,581,159 | 5/1971 | Piper et al. | 29/570 X |
| 3,789,274 | 1/1974 | Pfister et al. | 29/570 X |
| 3,971,970 | 7/1976 | Voyles et al. | 361/433 |
| 4,064,611 | 12/1977 | Sobozenski et al. | 29/270 |
| 4,090,288 | 5/1978 | Thompson et al. | 29/270 |
| 4,093,972 | 6/1978 | Voyles | 361/433 |
| 4,107,762 | 8/1978 | Shirn et al. | 361/433 |
| 4,231,075 | 10/1980 | Morimoto et al. | 361/433 |
| 4,282,645 | 8/1981 | Thompson et al. | 29/570 |
| 4,488,204 | 12/1984 | Beck | 361/433 |

FOREIGN PATENT DOCUMENTS 2046995 11/1980 United Kingdom ............... 361/433

Primary Examiner—Donald A. Griffin
Attorney, Agent, or Firm—Frederick J. McCarthy, Jr.

[57] ABSTRACT

Encapsulated chip electrolytic capacitors of precise dimensions having planar surfaces and planar anode and cathode terminals.

4 Claims, 12 Drawing Figures

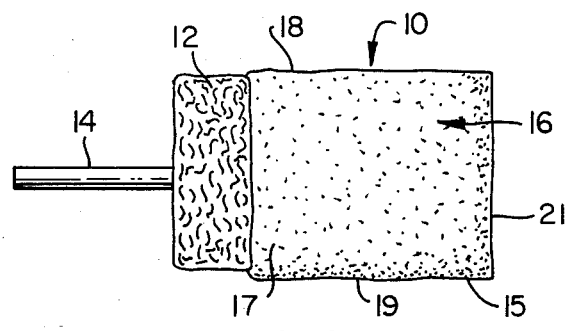
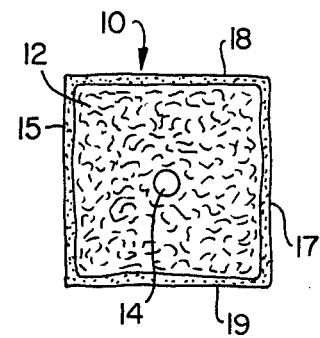
FIG. 1(c)          FIG. 1(a)
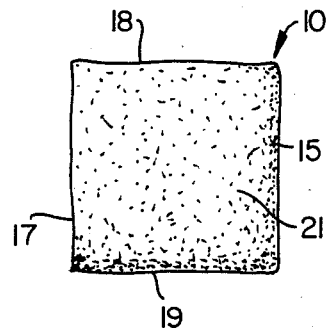
FIG. 1(b)
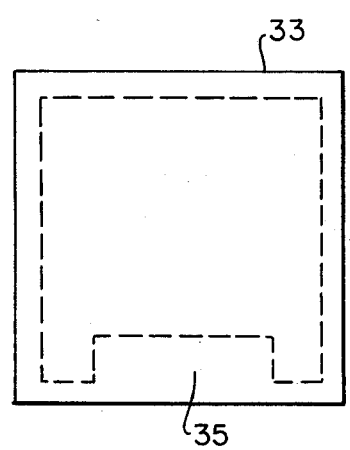
FIG. 2(a)
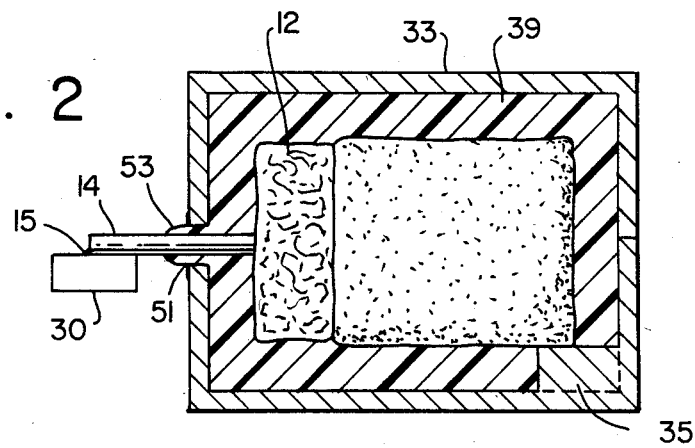
FIG. 2

ESCAPSULATED CHIP CAPACITOR ASSEMBLIES

The present invention relates to encapsulated chip capacitors. More particularly, the present invention relates to a capacitor assembly having planar surfaces of closely contolled dimensions and further has integral planar anode and cathode terminals which provide mounting and handling versatility particularly for surface mounting on printed circuit boards or hybrid substrates.

Encapsulated chip capacitor assemblies are well known in the art and a variety of the same have been disclosed in United States patents, for example, in U.S. Pat. Nos. 4,247,883 and 4,282,645-D. G. Thompson and J. T. Ogilvie and U.S. Pat. No. 4,059,887-J. L. Galvagni and U.S. patent application Ser. No. 547,643-R. L. Beck, Jr.

Notwithstanding the advances previously made in encapsulated chip capacitors, there remains the need to provide encapsulated chip capacitors having combined properties of precise dimensional control, ruggedness, high volumetric capacitance efficiency, ease of construction and mass production and ease and versatility or assembly in mass production of printed circuit board assemblies and hybrid circuits.

It is accordingly an object of the present invention to provide an encapsulated chip capacitor having the above-noted combination of properties.

Other objects will be apparent from the following description and claims taken in conjunction with the drawing wherein FIGs. 1(a), 1(b) and 1(c) show a solid electrolyte tantalum capacitor;

FIGS. 2 and 2(a) show encapsulation of a chip capacitor in accordance with the present invention;

FIGS. 3, 3(a) and 3(b) show an encapsulated chip capacitor in accordance with the present invention;

Figure 3:
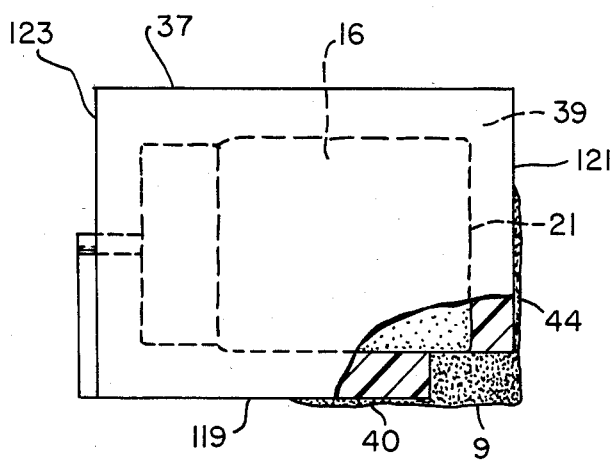
Figure 3A:
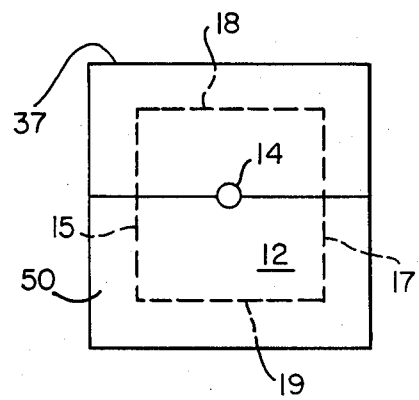
Figure 3B:
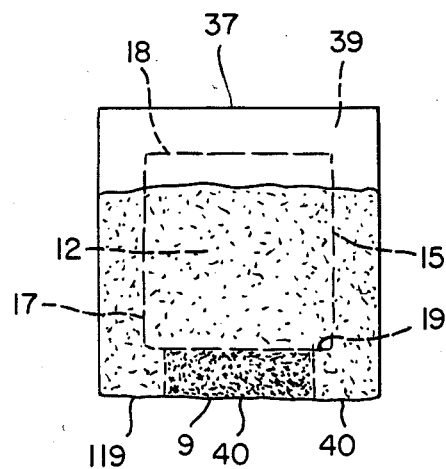

With reference to FIGS. 1(a), (b) and (c), an electrolytic tantalum capacitor is shown at 10 formed of a porous sintered tantalum anode body 12 from which extends a tantalum anode lead wire 14. A cathode metalization 16, e.g., of copper, silver alloy or solder, covers a substantial portion of the surface of sides 15, 17, top 18, bottom 19, and rear 21 of anode body 12 to provide a cathode connection for capacitor 10. The capacitor 10 is preferably of rectangular (vertical and longitudinal) cross-section to maximize volumetric efficiency.

Following the practice of the present invention, with reference to FIGS. 2 and 2(a), tantalum capacitor body 12 is attached to a conventional "process bar" 30 by a weld connection 15 to anode lead 14, and tantalum capacitor body 12 is enclosed in mold 33 in which it rests on a step 35 which is integral with the bottom of mold 33. The support of body 12 on step 35 permits anode lead 14 to fit loosely in mold 33 which avoids strain on the capacitor body. Also, the mold 33 can be readily filled with encapsulant 39 with excess exiting the mold at 51 forming "flash" 53 which is easily removed from the encapsulated capacitor. Encapsulant, for example epoxy commonly used in molding electronic components such as Hysol MG8F-0134 and Furane 460-982F, is introduced into the mold and conformally encapsulates tantalum capacitor body 12 to provide the substantially right parallelepiped planar surfaced body indicated at 37 in FIG. 3, the bottom surface 119 of which has a relatively small slot 9 (due to the presence of step 35 in mold 33) at a region spaced from the side surfaces 15, 17 of tantalum body 12. This slot 9 communicates with cathode metallization 15 and is wide enough to receive a copper metallization 40 to provide electrical contact with cathode metallization 15. Copper metallization 40 is also applied to the portion of the bottom encapsulant surface 119, adjacent rear encapsulant surface 121, and spaced from the front encapsulant surface 123. A copper metallization 44 is also provided on rear encapsulant surface 121 at a portion adjacent bottom encapsulant surface 119 and in electrical contact with copper metallization 40. The metallization 40, 44 is suitably applied by plasma arc spray technique described in U.S. Pat. No. 3,581,159-J. Piper et al. To achieve satisfactory adherence of the metallization on the encapsulant, the surface is roughened by mechanical abrasion, such as by grit blasting and the roughened surface is cleaned by conventional techniques such as air blasts, water washes or etching.

A metal strip 50, e.g., suitably made of solder coated nickel and of a thickness substantially the same as the length of the portion of anode lead wire 14 extending from the front encapsulated surface 123, is arranged abutting front encapsulant surface 123 and welded to anode lead 14 to provide the anode terminal.

Figure 4:
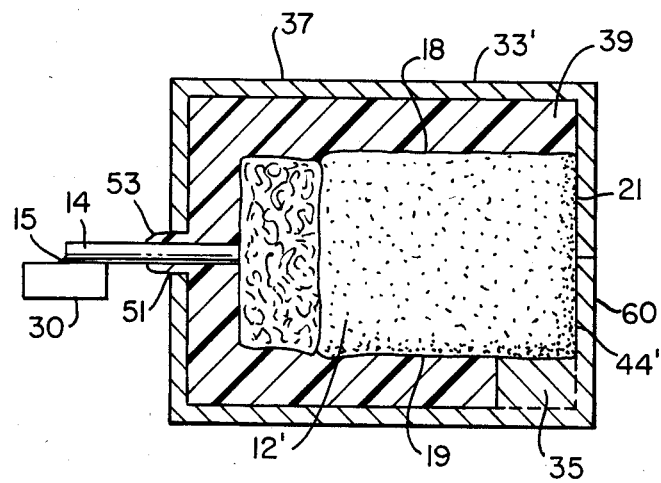
FIGS. 4 and 4(a) show a further embodiment of the present invention.
Figure 4A:
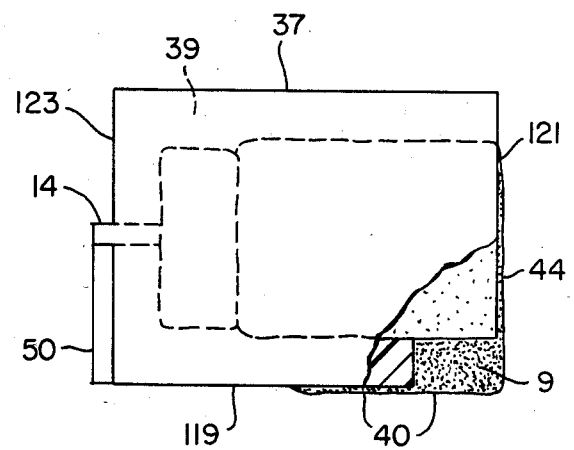
Figure 5:
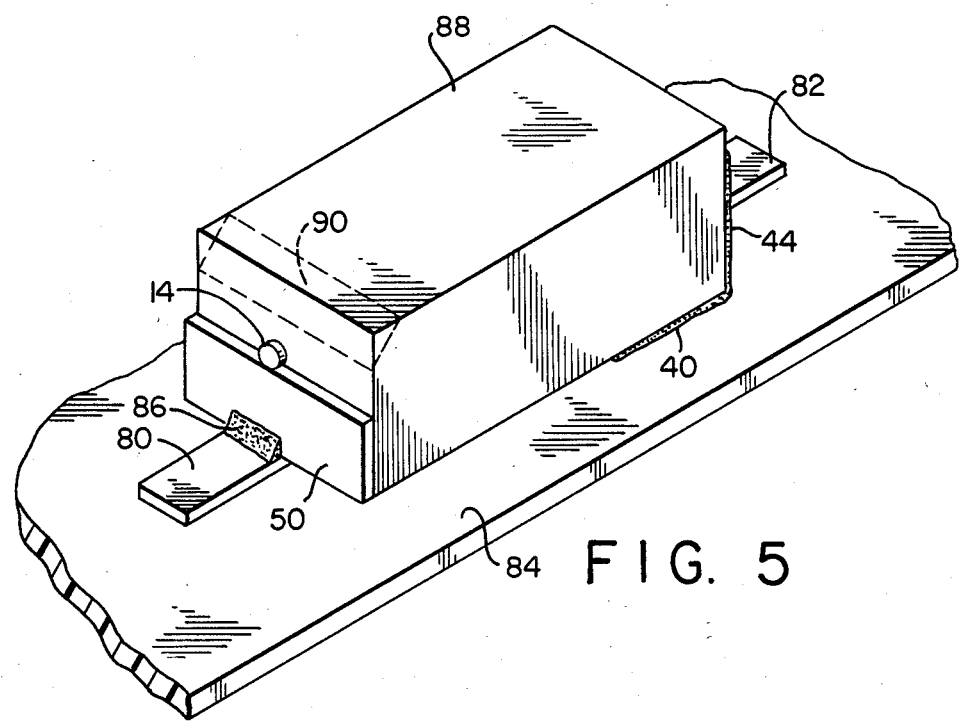
FIGS. 5 and 5(b) show a finished encapsulated chip capacitor of the present invention mounted on a circuit board.

As shown in FIGS. 4 and 5, increased volumetric efficiency can be obtained when a tantalum capacitor body 12' is arranged in a mold 33' wherein the rear surface 21 of the tantalum body 12 abuts the end wall 60 of mold 33'. In this embodiment rear surface 21 is not covered with encapsulant and copper metallization 44' is applied to the rear surface 21 of tantalum capacitor body 12.

The encapsulated chip capacitor assembly of the present invention has a combination of substantial advantages, e.g., precise dimensional control, high volumetric efficiency of capacitance, planar surfaces adapted for automated handling and assembly operations and efficient electrical connection to circuit boards, mounting versatility and adaptability for automated production.

Figure 5A:
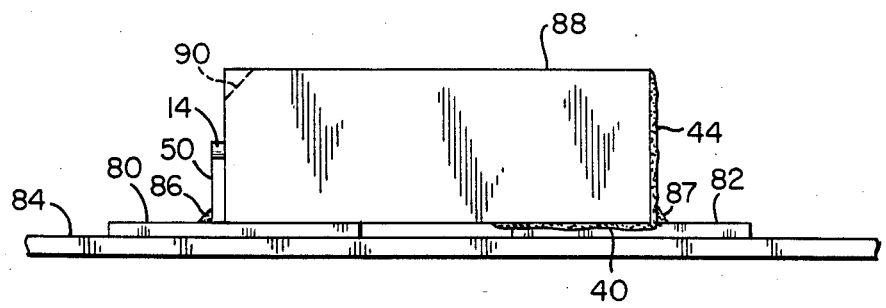

With reference to FIGS. 5 and 5(a), it can be seen that the encapsulated chip capacitor made in accordance with the present invention, when mounted on metal lands 80, 82 of a circuit board 84, enables the formation of an extended and readily inspected solder connection 86 at the anode terminal and a comparable solder connection 7 can be made at the cathode terminal.

Also, the completely planar, upper epoxy surface 88 of the encapsulated chip capacitor assembly 100 of the present invention enables the efficient transport of the same by commonly used commercial devices such as conventional vacuum probe "pick up" apparatus to accomplish a transfer from a precisely defined location such as a pocket in a continuous tape or other automatic dispensary system.

An edge of the encapsulated chip capacitor can be bevelled, as indicated at 90 in FIGS. 5 and 5(a) to enable ready polarity identification.

What is claimed is:

1. An encapsulated chip capacitor comprising (a) a tantalum body of generally rectangular cross-section having front, rear, bottom, top and side surfaces with portions of said bottom and side surfaces being provided with a cathode metallization, (b) an axial tantalum lead wire extending from said front surface, (c) encapsulated insulating material substantially conformally molded around said tantalum body covering said front, top rear and side surfaces, of said body, and said bottom surface of said body except for a relatively small region thereof spaced from the respective side surfaces of said body whereby a slot is provided in said encapsulant communicating with and exposing a portion of said cathode metallization in said tantalum body, (d) a copper metallization on a portion of the encapsulant covering the bottom surface and adjacent rear surface of said tantalum body and in said slot and on the cathode metallization of the tantalum body exposed by said slot to provide a cathode terminal, (e) a thin metal strip abutting the encapsulant covering the front surface of said capacitor body having a width which is coextensive with a portion of said axial tantalum lead wire extending from said encapsulant and being welded thereto to provide an anode terminal.

2. An encapsulated chip capacitor in accordance with claim 1 wherein said rear surface of said tantalum capacitor body is not covered with encapsulant and said copper metallization is provided on said rear surface of said tantalum capacitor body is not covered with encapsulant and said copper metallization is provided on said rear surface of said tantalum capacitor body.

3. An encapsulated chip capacitor in accordance with claim 1 wherein said encapsulant insulating material comformally molded around said tantalum body is in the shape of a right parallelepiped.

4. An encapsulated chip capacitor in accordance with claim 1 wherein the edge of at least one surface is bevelled.

* * * * *